(12) United States Patent
Nishikawa et al.

(10) Patent No.: US 7,572,404 B2
(45) Date of Patent: Aug. 11, 2009

(54) VEHICLE INTERIOR ARTICLE OF SKIN-INTEGRATED LAMINATE, METHOD FOR MANUFACTURING NON-FOAMING POLYURETHANE RESIN AND METHOD FOR MANUFACTURING SKIN-INTEGRATED LAMINATE USING THE SAME

(75) Inventors: Shinji Nishikawa, Kawabe-gun (JP); Hiroaki Ido, Nishinomiya (JP); Hiroshi Ikuta, Amagasaki (JP); Masaru Suzuki, Sanda (JP)

(73) Assignee: Bayer MaterialScience AG, Leverkusen (DE)

( * ) Notice: Subject to any disclaimer, the term of this patent is extended or adjusted under 35 U.S.C. 154(b) by 481 days.

(21) Appl. No.: 11/408,197

(22) Filed: Apr. 20, 2006

(65) Prior Publication Data

US 2006/0264522 A1 Nov. 23, 2006

(30) Foreign Application Priority Data

Apr. 28, 2005 (JP) ............................. 2005-132466

(51) Int. Cl.
*B29C 45/14* (2006.01)
(52) U.S. Cl. ..................................... 264/328.6; 264/255
(58) Field of Classification Search ........................ None
See application file for complete search history.

(56) References Cited

U.S. PATENT DOCUMENTS 3,609,107 A * 9/1971 Boyer et al. ................. 521/168
4,218,543 A    8/1980 Weber ........................ 521/51
4,314,962 A * 2/1982 Wollensak et al. ........ 264/328.6
5,969,047 A   10/1999 Ngoe et al. .................. 525/123
6,294,248 B1  9/2001 Madan et al. ............. 428/318.6

FOREIGN PATENT DOCUMENTS

| GB | 1 534 258 | 11/1978 |
| JP | 53-86763 | 7/1978 |
| JP | 2003-19056 | 1/2003 |

\* cited by examiner

*Primary Examiner*—Monica A Huson
(74) *Attorney, Agent, or Firm*—Connolly Bove Lodge & Hutz LLP

(57) ABSTRACT

The present invention is directed to skin-integrated laminates and their use as vehicle interior articles, in which the laminates feel comfortable to the touch and have a high quality of external appearances. The invention also relates to a method for manufacturing these non-foaming polyurethane resins for use as design skins in vehicle interior articles and to a method for manufacturing a skin-integrated laminate from these non-foaming polyurethane resins, with both methods having increased productivity and lower cost, and without any adverse influence on the work environment. The non-foaming polyurethane resin forms a design skin surface by a reaction injection molding process, in which (I) a polyol mixture of (1) a polyol, (2) a chain extender which is 1-methyl-3,5-diethyl-2,4-diaminobenzene and/or 1-methyl-3,5-diethyl-2,6-diaminobenzene, (3) a catalyst, and (4) optionally, an auxiliary agent, and (II) a polyisocyanate compound, are reacted. The surface hardness of the non-foaming polyurethane resin, as measured by an Asker A hardness meter, is from 30 to 70.

1 Claim, No Drawings

VEHICLE INTERIOR ARTICLE OF SKIN-INTEGRATED LAMINATE, METHOD FOR MANUFACTURING NON-FOAMING POLYURETHANE RESIN AND METHOD FOR MANUFACTURING SKIN-INTEGRATED LAMINATE USING THE SAME

CROSS REFERENCE TO RELATED PATENT APPLICATION

The present patent application claims the right of priority under 35 U.S.C. §119 (a)-(d) of Japanese Patent Application No. 2005-132466 which was filed on Apr. 28, 2004.

The present invention relates to a method for manufacturing a non-foaming polyurethane resin which is suitable as the skin for the design faces of vehicle interior articles including articles such as instrument panels and door trims, and to a method for manufacturing a skin-integrated laminate from these non-foaming polyurethane resins.

BACKGROUND OF THE INVENTION

Many kinds of materials manufactured by various molding processes have been used as skins for vehicle interior articles. For example, previously used materials include articles manufactured by vacuum-molding vinyl chlorides (PVC), articles manufactured by vacuum-molding or powder-molding thermoplastic olefins (TPO), articles manufactured by slush-molding thermoplastic polyurethanes (TPU), and articles manufactured by spraying or reaction injection molding (RIM) polyurethane raw materials (i.e., polyurethane liquid mixtures obtained by impinging and mixing two liquids, i.e. a liquid polyol and a liquid isocyanate, under a high pressure). In general, polyurethane raw materials are subjected to reaction injection molding to provide molded articles.

The molded articles of these materials have some defects, however. For example, PVC molded articles are undesirable since they release dioxin and chlorinated by-products while decomposing, thus polluting the environment. In addition, these materials are also hard to scrap or recycle.

TPO molded articles prepared by vacuum molding are undesirable as they feel hard and uncomfortable to touch. Molded articles prepared by powder molding are poor in production efficiency, as are the PVC molded articles, and thus these are inferior in cost-effectiveness since the molding processes require a relatively long time and consume a lot of energy.

TPU molded articles by slush molding are improved in terms of their feel and touch, but they are also poor in production efficiency and cost-effectiveness. The slush mold process also requires a relatively long time and a lot of energy.

Polyurethane molded articles which are manufactured by spraying polyurethane raw materials are an improvement over the conventional TPU molded articles produced by slush molding, because of the high productivity thereof. Since these polyurethane molded articles are generally manufactured from highly reactive raw materials, high productivity can be expected. Over-spray of the raw materials results in fumes and vapors which pose various industrial hygiene concerns. This is unavoidable, however, due to the process of spraying the raw materials. Consequently, the removal of the over-sprayed raw materials around the molds, which requires a considerable amount of time, is indispensable. As a result, the productivity is lowered due to the time spent for the removal of these over-sprayed raw materials. In addition, the quantities of raw materials which are used in the spraying process are increased because of the unavoidable over-spray of the raw materials. This also leads to an undesirable higher cost, as well as to pollution in the work environment.

The spraying process also has disadvantages in that the polyurethane raw materials which are sprayed are subject to the influences of atmospheric temperatures and humidity, and tend to absorb the water content from the air, or the air itself will form bubbles in the resultant articles. As a result of these influences, the raw materials tend to foam. In another situation, when molding a large vehicle interior article, it is necessary to spray the polyurethane raw material into the mold many times, which results in the layers of the polyurethane materials tending to have variable densities and hardness at the interfaces between each of the layers formed before and after the spraying of the polyurethane raw material. Thus, the surface of the resultant article feels inharmonious in touch. For these reasons, the resultant skin is varied in density, thickness, hardness and feeling.

A molded article obtained by the reaction injection molding (RIM) of polyurethane raw materials can have a highly designable appearance, because the unevenness of a surface can be precisely reproduced. In addition, the volume of the raw material in the mold is constant, so that the resultant article is stabilized in density, thickness and hardness. For these advantages, this method has been employed in a wide range of fields. In general, the thickness of a skin for use as the design surface of a vehicle interior article ranges from about 0.5 to about 3.0 mm, which is thinner than ordinary molded articles produced by a RIM process. Therefore, the raw material has higher flow resistance. In consideration of ensuring the filling of the raw material completely to the tip ends of the article, it is indispensable to lower the reactivity of the raw material. For this reason, the cure time (i.e. the time from the injection of the polyurethane raw material into the mold to the start of opening the mold) becomes longer, and results in poor productivity.

Skin-integrated vehicle interior articles such as instrument panels whose skins are used as design surfaces and door trims, and in particular, vehicle instrument panels, must not only have physical properties such as UV stability, wear resistance, expandability for air bag and durability, but also demand a high quality of external appearances and comfortable feeling (i.e. comfortable to the touch). Under these circumstances, it is desired to find a method for manufacturing an integrally molded laminate which comprises a skin as a design surface, a core material supporting the skin, and optionally, a semi-rigid polyurethane foam for reducing the impact between the skin and the core material, in which the method is characterized by a shorter cycle time and the yield is improved, giving higher productivity and at lower production cost.

Materials which feel comfortable in terms of touch and which can be manufactured in high productivity and at lower production cost have been demanded as skins for the interior articles of vehicles, in particular, automobiles. Previously, there have been several proposals known for these materials and their processes of manufacturing them.

The reference JP-A-52-142797 discloses a method for manufacturing a polyurethane elastic molded article, which comprises using a specified polyol and a specified aromatic diamine. In this reference, a method of molding a polyurethane elastomer in a shorter time is described which requires a specified polyol and a specified aromatic diamine. According to this publication, the molded articles are relatively large exterior parts, with weights of 3 to 10 kg or more, such as bumpers for vehicles, etc. In the Examples of this publication, articles with a thickness of 4 mm, having a Shore A hardness of as relatively high as 84 or more, are produced. By comparison, the skins in accordance with the present invention for use as the design surfaces of vehicle interior articles are not of this type.

JP-A-53-86763 discloses a method for forming a foam layer in tight contact with a skin. This method comprises the steps of forming a skin by the reaction injection molding of a polyurethane raw material in the cavity of a mold; allowing the skin to remain in the mold and removing the first core part; placing a second core part which is capable of shaping a cavity equivalent to the thickness of a foam layer, instead of the first core part; and injecting a foaming material into the cavity, thereby forming the foam layer in tight contact with the skin. This reference proposes a method of molding an interior article integral with a skin. However, this publication only describes that the material for the skin is of the urethane type, and does not disclose any details about the composition of a urethane material suitable for this method, the density of urethane and/or the surface hardness of the skin.

The reference JP-A-2003-19056 discloses a seat cushion using a seamless skin material and a method for manufacturing the same. This publication proposes a seat cushion comprising a foam article having practically the same contour as that of the seat cushion, and a seamless skin material adhered and integrated into the surface and side faces of the foam article. However, this reference also only describes that the material for the skin is of the urethane type, and does not describe or disclose any details about the composition of a urethane material suitable for this method, the density of urethane and/or the surface hardness of the skin material.

Patent Literature 1: JP-A-52-142797
Patent Literature 2: JP-A-53-86763
Patent Literature 3: JP-A-2003-19056

At this time, there is no satisfactory skin which feels comfortable in touch, and has a high quality of outer appearance for application as a skin for a vehicle interior article, and which can be manufactured in high productivity and at lower cost without having any adverse influence on the work environment and/or nature. Also, there is no satisfactory method currently available for manufacturing a skin-integrated laminate comprising such a skin.

SUMMARY OF THE INVENTION

The objects of the present invention are to provide skin-integrated laminates which are suitable for use as vehicle interior articles, which feel comfortable to touch and have a high quality of external appearances, which can be manufactured at higher productivity rates and at lower cost, without having any adverse influence on the work environment and nature. Another object is to provide a method for manufacturing a non-foaming polyurethane resin which is suitable for use as the skin of a vehicle interior article, and to provide a method for manufacturing a skin-integrated laminate from the non-foaming polyurethane resin.

A result of various efforts to solve the above problems has resulted in the discovery of a method, as described below, for manufacturing a non-foaming polyurethane resin which is suitable for use in skins for vehicle interior articles, and a method for manufacturing a skin-integrated laminate comprising the non-foaming polyurethane resin.

The present invention is directed to a vehicle interior article which is a skin-integrated laminate comprising a core material and a skin of a non-foaming polyurethane resin, which serves as a design face. In this vehicle interior article, this skin of non-foaming polyurethane resin is obtained by a reaction injection molding process, in which the non-foaming polyurethane resin comprises a polyol mixture (I) and a polyisocyanate compound (II).

Suitable polyol mixtures (I) comprise:
(1) a polyol,
(2) a chain extender which comprises 1-methyl-3,5-diethyl-2,4-diaminobenzene, 1-methyl-3,5-diethyl-2,6-diaminobenzene and mixtures thereof, with the chain extender being present in an amount of 2.0 to 7.0 parts by weight, based on 100 parts by weight of (1) the polyol mixture,
(3) at least one catalyst, and (4) optionally, one or more auxiliary agents.

The non-foaming polyurethane resin produced herein has a surface hardness of 30 to 70, as measured with an Asker A hardness meter.

The present invention also provides a vehicle interior article which comprises the above skin-integrated laminate having a semi-rigid polyurethane foam between the core material and the skin, as the design face, formed of the non-foaming polyurethane resin as described above;

Further, the present invention provides a method for manufacturing a non-foaming polyurethane resin for use in vehicle interior articles which comprises reaction injection molding of (I) a polyol mixture comprising (1) a polyol, (2) a chain extender, (3) at least one a catalyst, and, (4) optionally, one or more auxiliary agents, and (II) a polyisocyanate compound (II). In this process, the chain extender (2) comprises 1-methyl-3,5-diethyl-2,4-diaminobenzene, 1-methyl-3,5-diethyl-2,6-diaminobenzene, or mixtures thereof, and is present in an amount of 2.0 to 7.0 parts by weight, based on 100 parts by weight of the poly mixture. The non-foaming polyurethane resin forms in a cure time of 30 to 100 seconds so that the thickness of the resultant layer can be 0.5 to 3.0 mm, with the condition that the gel time of a reaction mixture of (I) the polyol mixture and (II) the polyisocyanate compound is 5.0 to 15.0 seconds. In addition, the resultant non-foaming polyurethane resin has a surface hardness of 30 to 70, as measured with an Asker A hardness meter.

Furthermore, the present invention provides a method for manufacturing a skin-integrated laminate which comprises a skin of the non-foaming polyurethane resin and a core material. This method comprising the steps of:
(1) installing the core material to a core part of a mold,
(2) applying a mold release agent on the surface of a cavity part of the mold,
(3) optionally, forming or applying a coating film by coating the surface of the cavity part of the mold,
(4) closing the core part and the cavity part of the mold,
(5) reaction injection molding a liquid mixture of (I) the polyol mixture and (II) the polyisocyanate compound, and (6) removing an integrally molded article.

The present invention also provides a method for manufacturing a skin-integrated laminate which comprises a skin of the non-foaming polyurethane resin, a semi-rigid foam and a core material. This method comprises the steps of
(1) applying a mold release agent on the surfaces of a core part and a cavity part of a mold for forming a skin surface which is suitable for use as a design face,
(2) optionally, forming or applying a coating film on the surface of the cavity part by a coating process,
(3) closing the core part and the cavity part of the mold,
(4) reaction injection molding of a liquid mixture of (I) the polyol mixture and (II) the polyisocyanate compound, (5) removing a molded article of the non-foaming polyurethane resin which is suitable as the skin for the design face,
(6) setting the molded article of the non-foaming polyurethane resin obtained from step (5), in the cavity part of a mold for shaping a foam,
(7) installing the core material to the core part of the above foam-shaping mold,
(8) injecting or pouring a semi-rigid polyurethane foam onto the molded article of the non-foaming polyurethane resin which was set in the cavity portion of the above foam-shaping mold employed in the step (6), with the mold being either opened or closed, and
(9) removing the molded article integrated with the skin.

DETAILED DESCRIPTION OF THE INVENTION

A skin-integrated molded article which feels soft and comfortable in touch, and has a high quality of external appearance, and which is suitable to be used as a skin for a design face of an interior article of a vehicle such as, for example, an automobile can be manufactured with higher productivity and at lower cost, without having any adverse influence on the work environment and nature. In accordance with the present invention, a laminate comprising a skin and a core material, or a laminate comprising a skin, a semi-rigid urethane foam and a core material, either of which has excellent properties, can be manufactured.

Examples of suitable polyether polyols to be used as (1) the polyol component of (I) the polyol mixture in the present invention include adduct compounds obtained by the addition of alkylene oxides, such as ethylene oxide and propylene oxide, to hydroxyl group-containing compounds, such as propylene glycol, diethylene glycol, glycerin, trimethylolpropane and pentaerythritol, and/or amino group-or hydroxyl group-containing compounds such as monoethanolamine, diethanolamine and triethanolamine, and/or amino group-containing compounds such as ethylenediamine and diaminotoluene.

Preferably, the polyether polyol suitable for use as (1) the polyol component herein has an average functionality of about 2.0 to about 3.0, a hydroxyl value of about 16.8 to about 56 mg KOH/g, and an end oxyethylene unit content of about 10% to 25% by weight. More preferably, the polyether polyol has an average functionality of about 2.0 to about 2.5, a hydroxyl value of about 28 to about 50 mg KOH/g, and an end oxyethylene unit content of about 15% to about 20% by weight. Preferably, the polyether polyol has a molecular weight of about 2,000 (when having an average functionality of about 2.0 and a hydroxyl value of about 56 mg KOH/g) to about 10,000 (when having an average functionality of about 3.0/a hydroxyl value of about 16.8 mg KOH/g). When the average functionality of the polyether polyol is in the range of about 2.0 to about 3.0, the curing time becomes suitably longer, and the elongation of the resultant molded article becomes higher. When the hydroxyl value of the polyether polyol is in the range of about 16.8 to about 56 mg KOH/g, the flowability of the liquid mixture comprising components (I) and (II) (which refers to the liquid mixture of (I) the polyol mixture, and (II) the polyisocyanate compound in the present invention) becomes higher, so that the mixture liquid can sufficiently fill the mold completely to the tip ends of the mold, and the resultant molded article can feel softer and more comfortable in touch because of the composition of the skin. When the content of the end oxyethylene unit is in the range of 10% to 25% by weight, the flowability of the liquid mixture of components (I) and (II) is further improved, and the curing time becomes suitably longer.

In accordance with the present invention, the polyether polyol of (1) the polyol component may be a mixture of two or more different polyether polyols. In this particular case, it is preferable to use these polyether polyols in relative amounts such that the averages of the functionality, the hydroxyl value and the end oxyethylene unit content of the mixture are in the range of about 2.0 to about 3.0, the range of about 16.8 to about 56 mg KOH/g, and the range of about 10% to about 25% by weight, respectively, and more preferably that the averages of functionality, the hydroxyl value and the end oxyethylene unit content of the mixture are in the range of about 2.0 to about 2.5, of about 28 to about 50 mg KOH/g, and the range of about 15% to about 20% by weight, respectively.

The chain extender (2) comprises 1-methyl-3,5-diethyl-2,4-diaminobenzene, 1-methyl-3,5-diethyl-2,6-diaminobenzene and mixtures thereof.

The chain extender (2) is blended in an amount of about 2.0 to about 7.0 parts by weight, per 100 parts by weight of (I) the polyol mixture. When the amount of the chain extender (2) is less than 2.0 parts by weight, the amount of the polyisocyanate to necessary react with (I) the polyol mixture becomes smaller, and undesirably, failure in mixing tends to occur. When this amount exceeds 7 parts by weight, the viscosity of the liquid mixture quickly becomes too high due to the reaction, which leads to poor flowability of the liquid mixture of components (I) and (II) such that they are unsuitable for practical use.

By using the chain extender (2) in an amount of 2.0 to 7.0 parts by weight, the flowability of the liquid mixture of components (I) and (II) is not impaired even when a thin layer of the non-foaming polyurethane resin having a thickness of 0.5 to 3.0 mm is formed. In addition, the mixing performance is still sufficient, as is the reactivity, and the curing time for molding can be controlled to 30 to 100 seconds, even when the mixing ratio of (I) the polyol mixture to (II) the polyisocyanate compound is decreased to 100 parts by weight (I) to 14 parts by weight (II).

The chain extender described above may be used in combination with any other chain extenders comprising aromatic polyamines, provided the physical properties of the resultant skin of the present invention are not impaired.

It is possible to mold a polyurethane resin layer with a thickness as thin as 0.5 mm up to 3.0 mm by a RIM process, using a polyurethane raw material comprising a glycol type chain extender such as monoethylene glycol, propylene glycol, butane diol, diethylene glycol or the like. In this case, however, the cure time needed is about 120 to about 180 seconds. This is because the liquid mixture shows too high a flow resistance to form such a thin layer, and it is necessary to have such reactivity as to sufficiently decrease the thickening rate during the reaction, in order to completely fill the polyurethane raw material up to the tip ends of the mold. In the meantime, to obtain a polyurethane resin layer feeling soft in touch, the surface hardness thereof is generally lowered by decreasing the amount of a glycol type chain extender. However, a polyurethane raw material comprising a glycol type chain extender such as, for example, monoethylene glycol, becomes hard to mix, when the mixing ratio of (I) the polyol mixture to (II) the polyisocyanate compound is less than 100 parts (I) to 25 parts (II) (by weight), so the amount of the polyisocyanate is decreased. Consequently, the resultant molded article tends to crack or blister due to the failure in mixing, and the reactivity of the polyurethane raw material becomes extremely low, so that a cure time of about 180 to about 300 seconds is necessary for a polyurethane raw material containing a glycol.

Suitable for use as (3) the catalyst are those conventional urethane-forming catalysts. The urethane-forming catalysts are categorized as amine catalysts, metal catalysts and the like. Examples of suitable amine catalysts include tertiary amines such as triethylenediamine, pentamethyldiethylenetriamine, 1,8-diazabicyclo-5,4,0-undecene-7, dimethylaminoethanol, tetramethylethylenediamine, dimethylbenzylamine, tetramethylhexamethylenediamine, bis(2-dimethylaminoethyl)-ether, N,N'-dimethylaminopropylamine, N,N'-dimethylaminopropanol, N,N'-dimethylethanolamine, and 1-isobutyl-2-methylimidazole; as well as tertiary amines such as N-methyl-N'-hydroxyethyl-piperazine, N,N'-dimethylaminoethoxyethanol, and N,N,N'-trimethylamino-ethylethanolamine. Examples of suitable metal catalysts include dimethyltin dilaurate, dibutyltin dilaurate, potassium acetate, potassium octylate, potassium lactate, and stannous dioctoate. In accordance with the invention, component (3) the catalysts may be used alone or in combination with each other. Thus, each of the amine catalysts and each the metal catalysts may be used alone, and preferably, an amine catalyst is used in combination with a metal catalyst.

The amount of the catalyst is adjusted such that the gel time of the liquid mixture of components (I) and (II) are within a range of 5.0 to 15.0 seconds. When the gel time is within the range of 5.0 to 15.0 seconds, the polyurethane raw material can be molded in a cure time as short as 30 to 100 seconds. The amount of component (3), the catalyst, is preferably from about 0.01 to about 2.00 parts by weight, more preferably about 0.10 to about 1.60 parts by weight, based on 100 parts by weight of (I) the polyol mixture. When the amine catalyst is used in combination with the metal catalyst, the amount of the amine catalyst is about 0.1 to about 1.5 parts by weight, preferably about 0.2 to about 1.3 parts by weight, per 100 parts by weight of (I) the polyol mixture; and the amount of the metal catalyst is about 0.01 to about 0.10 parts by weight, and preferably about 0.03 to about 0.07 parts by weight, per 100 parts by weight of (I) the polyol mixture.

The gel time is determined as follows: the liquid mixture (200 g) of (I) the polyol mixture and (II) the polyisocyanate compound is charged into a 500 ml polyester cup, under conditions that a high-pressure molding machine uses for molding, including that the temperature of the liquid mixture of components (I) and (II) is maintained at 30° C., and that the discharge rate is controlled at 200 g/sec. A tooth-pick is pushed in or out of the surface of the liquid mixture of components (I) and (II) which starts to react, so as to determine the gel time.

The term "gel time" as used herein referred to the period of time taken for the liquid mixture of components (I) and (II), which starts to react, to allow thread-like matters (i.e. gel) to be drawn therefrom, from the start of charging the liquid mixture.

If needed, component (4) one or more auxiliary agents may be added. Examples of (4) auxiliary agents include a foam stabilizer such as a silicon type foam stabilizer, a surfactant, a filler, a weathering agent such as an antioxidant and/or a UV absorber, and a stabilizer such as, for example, 2,6-di-t-butyl-4-methylphenol, tetrakis[methylene-3-(3',5'-di-t-butyl-4-hydroxyphenyl)propionate]methane, etc. The amount of the auxiliary agent to be added is typically not larger than 20% by weight such as, for example, 0.1 to 10% by weight, based on the total weight of the composition for polyurethane.

The polyol mixture, component (I), is prepared as a non-foaming polyol mixture, without adding water or any of foaming agents such as, for example, CFC and HCFC. The inclusion of water, such as the water content originally contained in the raw materials of the polyol mixture (I) and the water content included in the polyol mixture (I) while being handled, is unavoidable. However, the amount of water in (I) the polyol mixture is preferably 0.15% or less.

As (II) the polyisocyanate compound of the present invention, suitable polyisocyanate compounds include those having at least two isocyanate groups in the molecule, which are known to be suitable for use in conventional polyurethane resin compositions. Examples of suitable polyisocyanates for (II) include aromatic isocyanates such as diphenylmethanediisocyanate, trilenediisocyanate, polyphenylenepolymethylene polyisocyanate, xylilenediisocyanate, tetramethylxylilene diisocyanate, and 1,5-naphthalenediisocyanate; urethane-modified polyisocyanates, carbodiimide-modified polyisocyanates and isocyanurate-modified polyisocyanates obtained from these isocyanates.

Among these polyisocyanate compounds, the aromatic polyisocyanates and the modified products thereof are preferred because of their reactivities and the costs thereof. When the polyurethane resin is required to have light resistance, it is preferable to apply a coating having light resistance to the surface of the resin.

The mixing ratio of (I) the polyol mixture to (II) the polyisocyanate compound is preferably from 90 to 125, in terms of the isocyanate index [(i.e. the ratio of the equivalents of the isocyanate groups in (II) the polyisocyanate compound to the equivalents of the active hydrogen in (I) the polyol mixture,)× 100].

The density of the non-foaming polyurethane resin of the present invention is preferably about 1.00 g/cm$^3$ to about 1.10 g/cm$^3$, more preferably about 1.05 g/cm$^3$ to about 1.10 g/cm$^3$. When this density is about 1.00 g/cm$^3$ to about 1.10 g/cm$^3$, no foam is visually observed, so that such a non-foaming polyurethane resin can be preferably used as a skin for a design face of an interior article. When the water content of the polyol mixture (I) is not larger than about 0.15%, the density of the non-foaming polyurethane resin becomes substantially the same value as a density attributed to the mixing ratio of the liquid mixture of components (I) and (II). Thus, a non-foaming polyurethane resin with a density of 1.0 g/cm$^3$ to 1.10 g/cm$^3$ can be obtained.

The RIM process can be carried out with any of the conventional RIM machines such as, for example, the "A system high-pressure reaction machine" which is manufactured by CANON INC.

The liquid temperatures of (I) the polyol mixture and (I) the polyisocyanate compound during the RIM process are preferably within a range of 30 to 40° C. Within this range of temperatures, the reactivity and viscosity of the liquid mixture of components (I) and (II) are suitable, and the flowability thereof is good.

The temperature of the mold is preferably 50 to 80° C., and more preferably 50 to 60° C. When the temperature of the mold is 50 to 80° C., the liquid mixture of components (I) and (II) can be smoothly reacted to form polyurethane in a cure time of 30 to 100 seconds.

In case where a raw material satisfying the following condition is subjected to the RIM process with the temperature of the mold controlled at a temperature of 50 to 80° C., the flowability of the liquid mixture of components (I) and (II) is not impaired, and a cure time as short as 30 to 100 seconds is sufficient for the molding, even when a thin layer of a non-forming polyurethane resin with a thickness of 0.5 to 3.0 mm is formed by molding. In this regard, the above described condition requires that the raw material contains 1-methyl-3,5-diethyl-2,4-diaminobenzene, 1-methyl-3,5-diethyl-2,6-diaminobenzene or mixtures thereof as the chain extender (2), in an amount 2.0 to 7.0 parts by weight per 100 parts by weight of the polyol mixture (I), and (3) the catalyst in such an amount that the gel time of the liquid mixture of components (I) and (II) can be from 5.0 to 15.0 seconds. When, for example, a raw material using (3) the catalyst in such an amount that the gel time of the liquid mixture of components (I) and (II) can be 8 seconds is subjected to a RIM process, with the temperature of a mold controlled at 55° C., the raw material can be molded in a cure time of as little as 60 seconds.

The surface hardness of the non-foaming polyurethane resin thus obtained is preferably 30 to 70 as measured with an Asker A hardness meter, and more preferably 30 to 60. At these Asker A hardness levels, the resin layer feels soft and comfortable in touch.

As a comparative trial, a non-foaming polyurethane resin layer with a thickness as so thin as 0.5 mm to 3.0 mm was formed by a RIM process, with the temperature of the mold controlled at 50 to 80° C., from a polyurethane raw material which contained a glycol type chain extender such as, for example, monoethylene glycol, and the amount of the catalyst (3) present was such that the gel time of the liquid mixture of components (I) and (II) could be 5.0 to 15.0 seconds. As a result, a cure time of about 120 to about 180 seconds was needed for the raw material to be molded.

An interior article of the present invention which is a skin-integrated laminate comprising a non-foaming polyurethane resin and a core material, and particularly a skin-integrated molded article which is suitable for use in a vehicle interior article, can be manufactured by a method comprising the following steps:

(1) installing a core material into a core part of a mold,
(2) applying a mold release agent on the surface of a cavity part of the mold,
(3) optionally, forming or applying a coating film on the surface of the cavity part of the mold, by a suitable coating process,
(4) closing the core part and the cavity part of the mold,
(5) reaction injection molding a liquid mixture of (I) the polyol mixture and (II) the polyisocyanate compound into the unfilled portion of the closed mold, and (6) removing the molded article integrated with a skin from the mold.

In this manufacturing method, the core part of the mold refers the side part of the mold on which the core material is installed, and the cavity part of the mold refers to the side part of the mold on which is a design surface or on which a design surface is capable of being formed.

The core material is previously formed in the shape of the skin-integrated molded article for the vehicle interior article. Examples of suitable core materials include polypropylene resins, polycarbonate/ABS resins, ABS resins, and polyurethane resins. In particular, the polypropylene resins are widely used.

The mold release agent may be any of wax type and water type which is suitable for use in the conventional RIM process.

The coating film to be applied on the surface of the cavity part should have photostability and wear resistance properties.

In the above described manufacturing method, the non-foaming polyurethane resin which forms the skin is not prepared by spraying. Accordingly, there is no over-spray of the liquid mixture of components (I) and (II) which occurs, and no adverse influence on the work environment and/or nature occurs as a result of this process. In addition, the skin material can be manufactured at a higher production efficiency with less waste of raw materials during the manufacturing, which leads to a further decrease in the manufacturing cost, particularly when compared with other skin materials such as PVC, TPO and TPU.

Furthermore, there is no problem with air or moisture in the air being incorporated into the raw materials since spraying is not being used. Thus, the foaming of the non-foaming polyurethane resin or the formation of bubbles with larger sizes in the non-foaming polyurethane resin is unusual and does not typically occur in the present invention. Consequently, the skin which forms the design face of the interior article is not so expanded due to an increase in temperature in the present invention. Over-expansion of the skin can be visually recognized as a fatal defect in view of the external appearance of the design face.

According to the present manufacturing method, the interior article which is the skin-integrated laminate comprising the non-foaming polyurethane resin and the core material can be manufactured with one mold by one shot of the non-foaming polyurethane resin, and in a shorter molding time which corresponds to the cure time of the non-foaming polyurethane resin, i.e., 30 to 100 seconds. Thus, the highly efficient manufacture of the skin-integrated laminate and the reduction of the manufacturing cost are now possible.

In addition, there can be produced a skin-integrated molded article suitable for a vehicle interior article in accordance with the present invention, which comprises, as a design layer, the non-foaming polyurethane resin layer which has a thickness as thin as 0.5 mm to 3.0 mm, but feels soft and comfortable to touch.

In addition to the above manufacturing method, an interior article, and specifically a skin-integrated molded article suitable for a vehicle interior article, which is a skin-integrated laminate comprising a non-foaming polyurethane resin, a semi-rigid polyurethane foam and a core material, can be manufactured in accordance with the present invention. This method comprises the steps of:

(1) applying a mold release agent onto the interior surfaces of a core part and a cavity part of a mold which is suitable for shaping or forming a skin as the design face of a molded article,
(2) optionally forming or applying a coating film on the surface of the cavity part of the mold, by a suitable coating process,
(3) closing the core part and the cavity part of the mold,
(4) reaction injection molding a liquid mixture comprising (I) the polyol mixture as described above and (II) the polyisocyanate compound as described above into the closed mold,
(5) removing molded product of the non-foaming polyurethane resin which is suitable as the skin for the design face,
(6) placing or setting the molded product of the non-foaming polyurethane resin produced in step (5), in the cavity part of the mold for shaping a foam,
(7) installing a core material on the core part of the foam-shaping mold from step (6),
(8) injecting or pouring a semi-rigid polyurethane foam onto the non-foaming polyurethane resin molded product placed or set in the cavity part of the mold employed in step (6), with the mold being either opened or closed, and (9) removing the resultant molded article integrated with the skin.

In the above process, step (8) of injecting or pouring the semi-rigid polyurethane foam when the mold is opened is carried out by injecting the semi-rigid polyurethane foam onto the molded product of the non-foaming polyurethane resin previously placed or set in the cavity part of the foam-shaping mold, and then closing the core part and the cavity part of the foam-shaping mold. On the other hand, step (8) of injecting the semi-rigid polyurethane foam when the mold is closed is carried out by subjecting the semi-rigid polyurethane foam mixture to reaction injection molding such that it enters into the space between the molded part of non-foaming polyurethane resin and the core material, while the core part and the cavity part are closed. Either of these methods may be selected, as desired or required.

In the above described manufacturing method, two molds are needed. In particular, one mold (i.e. a first mold) is needed for shaping and forming the non-foaming polyurethane resin which is suitable for use as the skin, and the other mold (i.e. the second mold) is needed for injecting or pouring the semi-rigid polyurethane foam. The first mold is used in steps (1) through (5) of the above process, and the second mold is used in steps (6) through (9) of the above described process.

The semi-rigid polyurethane foam of this method can be prepared by blending the conventional raw materials which are known to be suitable for the production of crush pads (e.g., a polyisocyanate component and a polyol component), and curing the mixture.

The density and hardness of the semi-rigid polyurethane foam may be optionally adjusted according to a desired end use. In accordance with the present invention, it is possible to form semi-rigid polyurethane foams having a density of 0.12 to 0.23 kg/cm$^3$ and a surface hardness of 35 to 50 measured with an Asker C hardness meter. For example, a semi-rigid polyurethane foam having a density of 0.185 g/cm$^3$ and a surface hardness of 40 measured with an Asker C hardness meter can be used.

The core material may be the same one as that used in the conventional laminate comprising the non-foaming polyurethane resin and the core material. If necessary, to improve the adhesion between the core material and the semi-rigid polyurethane foam, the surface of the core material may be subjected to a flame treatment or plasma treatment. It may also be treated to impart an anchoring effect or may be coated with a primer for improving the adhesiveness.

In, or preferably before step (6) of the above described process, it is preferred to remove any of the wax type or water type mold release agent which is typically used in a RIM process, from the surface of the non-foaming polyurethane resin which will be in contact with the semi-rigid polyurethane foam. This is to ensure the adhesion between the non-foaming polyurethane resin molded product obtained in the step (5) and the semi-rigid polyurethane foam that is formed in the second mold.

Also, the coating film which is formed or applied onto the surface of the cavity part of the mold may be the same one as the previously described coating film that is characterized by light stability and wear resistance properties, of the conventional laminate comprising the non-foaming polyurethane resin and the core material.

Also, in the present manufacturing method, the non-foaming polyurethane resin which is suitable for use as the skin is not formed by spraying. Therefore, no over-spray of the liquid mixture comprising components (I) and (II) occurs, and thus, there is no adverse influence on the work environment and/or nature. Furthermore, the skin material can be manufactured in higher production efficiency with less waste of raw materials during the manufacturing. This also leads to a decrease in the manufacturing cost, particularly in comparison with other skin materials such as PVC, TPO and TPU.

In addition, there is no incorporation of the air or the moisture in the air into the raw material which is being sprayed in accordance with the present invention. Thus, the foaming of the non-foaming polyurethane resin and/or the formation of bubbles with larger sizes rarely results. Consequently, the skin which is suitable as a design face for an interior article is not over expanded due to an increase in temperature, which can be visually recognized as a fatal defect in view of the external appearance of the design face.

Furthermore, there is typically no formation of bubbles with larger sizes, and accordingly, the non-foaming polyurethane resin molded product is not impregnated with the semi-rigid polyurethane foam. Thus, the non-foaming polyurethane resin molded product which is suitable for use as the skin feels smooth to touch, without any inharmonious feeling due the impregnation.

In accordance with the present invention, the manufacture of a skin-integrated molded article for a vehicle interior article, which comprises the core material, the semi-rigid polyurethane foam, and the non-foaming polyurethane resin as the skin for a design face, in which the skin which has a thickness of 0.5 mm to 3.0 mm, and feels soft and comfortable to touch.

The following Examples further illustrate the present invention in detail. The present invention is not restricted by these Examples. Parts and % in these examples are parts by weight and weight %, respectively.

EXAMPLES

Each of the performance evaluation method and the evaluation standard for non-foaming polyurethane resin are as described below:

(1) Sample Preparation

The samples for evaluation were prepared by using a mold having the size of 900 mm×300 mm×1 (thickness) mm by a RIM molding process using, for example, the "A System high pressure reaction machine" manufactured by Canon Inc. (Throughout the specification, the letter "t" is used to designate thickness.) At the time of molding, the discharge rate of mixture liquid (I) and (II) was 200 g/second and the mixing pressure was 15 MPa. The surface temperature of the mold was adjusted at 55° C.

(2) Evaluation Standard for the Curing Time

The surface appearance of molded article which was removed from the mold was observed by determining the state of "without blister" and "without roughness" by the visual observation. The time from pouring the mixture liquid (I) and (II) into the mold until opening of the mold is taken as the cure time.

(3) The Evaluation Standard on Mixing Performance by Stirring

Good: There was no crack and blister of the molded article which was caused by the lack of mixing and stirring.

Bad: There was crack and/or blister of the molded article which was caused by the lack of mixing and stirring.

(4) The Evaluation Method and Evaluation Standard on Flowability

Good: The mixture liquid (I) and (II) flowed completely into the ends of mold and there were no parts of molded article that were unfilled.

Bad: The mixture liquid (I) and (II) did not flow completely into the ends of mold, and there were parts of the molded article that were unfilled.

(5) The Measurement of the Tensile Strength (MPa), the Elongation (%) at Break and the Surface Hardness The measurement of the tensile strength (MPa) and the elongation (%) at break were carried out at room temperature using an Auto Graph AG-1(1KN) manufactured by Shimadzu Corporation.

The surface hardness was measured at 25° C. by an Asker A hardness meter.

The Evaluation of a Skin-Integrated Molded Article Comprising Laminate of a Non-Foaming Polyurethane Resin and a Core Material (1) The mold with the size of 300 mm×900 mm×4.0 (t) mm was used for preparation of the molded article. The core material made of polypropylene with about 3.0 mm thickness was fixed in the core mold by the double-stick tape in order to adjust the thickness of the non-foaming polyurethane resin to 1 mm. Then the skin-integrated molded article was made by the RIM molding after closing the mold. At the time of molding, the discharge rate of mixture liquid (I) and (II) was 200 g/second and the mixing pressure was 15 MPa. The surface temperature of mold was adjusted at 55° C.

(2) The curing time, the evaluation of mixing performance by stirring, evaluation of flowability and the measurement of the surface hardness were carried out in the same manner as in the performance evaluation method and the evaluation standard of non-foaming polyurethane resin.

(3) The bonding property between non-foaming polyurethane resin and core material made of polypropylene just after curing was determined by checking whether the delamination occurred between the skin made of non-foaming polyurethane resin and core material of polypropylene by visual observation.

The evaluation standard on the bonding property is as follows:
Good: Delamination was not caused.
Bad: Delamination was caused.

The Evaluation of a Skin-Intergrated Molded Article Comprising the Laminate of a Non-Foaming Polyurethane Resin, a Semi-Rigid Polyurethane Foam and a Core Material (1) A non-foaming polyurethane resin with about 1.0 mm thickness prepared by the same preparation method as set forth above, was set onto the cavity part of an article mold with the size of the mold being 300 mm×900 mm×11.0 (t) mm, and then the core material made of polypropylene with about 3 mm thickness was fixed on the core mold by the double-stick tape. After the mold was closed, the raw material for a semi-rigid polyurethane foam with the density of molded article of 0.185 g/cm³ was poured and foamed between the core material and the non-foaming polyurethane resin by the RIM molding. This formed an integral molding with skin.

(2) The semi-rigid polyurethane foam was poured using the "A System high pressure reaction machine" manufactured by Canon Inc.

The pouring quantity was 180 to 350 g/second.
The mixing pressure was 15 MPa. The pouring time was 1.2 to 2.5 seconds.
The temperature of mold was adjusted at 40° C.

(3) The evaluation of the integral molding with skin was done to determine whether the blister affected the quality of appearance on the non-foaming polyurethane which formed the skin of the integral molding by visual observation. The surface hardness was measured by an Asker A hardness meter and its surface hardness was assessed as to whether tactile impression was good or not.

The Judgment Standard for "Blister"

Good means that "blister" was not observed and the bonding property was good as there was no delamination with a semi-rigid polyurethane foam.

Bad means that "blister" was observed and the bonding property was bad as there was delamination with a semi-rigid polyurethane foam.

The types of starting materials, including functionality and hydroxyl value (mg KOH/g) of a polyether polyol used as the polyol in polyol mixture (I), chain extenders, catalysts, and various polyisocyanate compounds used as component (II) are described in Table 1.

The actual formulations of different non-foaming polyurethane resin moldings are shown in Table 2, and the results of the evaluation of these moldings are shown in Table 3.

The results of evaluation on the skin-integrated molded article comprising the laminate of a non-foaming polyurethane resin and a core material were shown in Table 4.

Example 1

By the using a polyol mixture (I) and a polyisocyanate compound (II), the details of which are shown in Table 1, the non-foaming polyurethane resin sample was prepared for evaluation using the formulation shown in Table 2 and a mold with the size of 900×300×1 (t) mm by the RIM process in the "A System high pressure reaction machine" manufactured by the Canon Inc. The surface temperature of the mold was adjusted to 55° C.

At the time of molding, the temperature of the polyol mixture (I) and the polyisocyanate compound (II) were adjusted to 30° C., the discharge rate of the liquid mixture comprising components (I) and (II) was 200 g/second and the mixing pressure was 15 MPa.

As shown in Table 3, the gel time was 8 seconds, the cure time was 60 seconds, the mixing performance and flowability were good and the resultant non-foaming polyurethane resin had the qualities of good appearance and good tactile impression, with the Asker A hardness of surface of 60.

Example 2

By using a polyol mixture (I) and a polyisocyanate compound (II), the details of which are shown in Table 1, the non-foaming polyurethane resin sample were prepared for evaluation using the formulation shown in Table 2, and under the same molding conditions as described in Example 1.

As shown in Table 3, the gel time was 14 seconds, the cure time was 70 seconds, the mixing performance and flowability were good and the resultant non-foaming polyurethane resin had the qualities of good appearance and good tactile impression, with the Asker A hardness of surface of 49.

Example 3

By the using a polyol mixture (I) and a polyisocyanate compound (II), the details of which are shown in Table 1, the non-foaming polyurethane resin sample was were prepared for evaluation using the formulation shown in Table 2, and under the same molding conditions as described above in Example 1.

As shown in Table 3, the gel time was 11 seconds, the cure time was 60 seconds, the mixing performance and flowability were good and the resultant non-foaming polyurethane resin had the qualities of good appearance and good tactile impression, with the Asker A hardness of surface of 53.

Example 4

By the using a polyol mixture (I) and a polyisocyanate compound (II), the details of which are shown in Table 1, the non-foaming polyurethane resin sample was prepared for evaluation using the formulation shown in Table 2, and under the same molding conditions as described above in Example 1.

As shown in Table 3, the gel time was 9 seconds, the cure time was 60 seconds, and the mixing performance and flowability were good and the resultant non-foaming polyurethane resin had the qualities of good appearance and good tactile impression, with the Asker A hardness of surface of 60.

Comparative Example 1

By the using a polyol mixture (I) and a polyisocyanate compound (II), the details of which are shown in Table 1, the non-foaming polyurethane resin sample was prepared for evaluation using the formulation shown in Table 2 and under the same molding conditions as described above in Example 1.

As shown in Table 3, the gel time was 6 seconds, the cure time was 150 seconds, the flowability was good, but mixing performance was not good.

The appearance of the resultant molded article was bad due to the blister and crack which were observed in the molded article after curing.

Comparative Example 2

By the using a polyol mixture (I) and a polyisocyanate compound (II), the details of which are shown in Table 1, the non-foaming polyurethane resin sample was prepared for evaluation using the formulation shown in Table 2 in which the quantity of chain extender comprising ethylene glycol was increased to 3 parts by weight from that in Comparative Example 1 as shown in Table 2, and under the same molding conditions as described above in Example 1.

As shown in Table 3, the gel time was 5 seconds, but the cure time was 120 seconds.

Comparative Example 3

By the using a polyol mixture (I) and a polyisocyanate compound (II), the details of which are shown in Table 1, the non-foaming polyurethane resin sample was prepared for evaluation using the formulation shown in Table 2. Specifically, this formulation varied from the invention in that the quantity of diethyl-diaminotoluene, i.e. the chain extender, was increased to 10 parts by weight from the amount used Example 4 as shown in Table 2. The same molding conditions as described above in Example 1 were used.

As shown in Table 3, the cure time was 60 seconds, but the gel time was only 3 seconds. This gel time was too fast. In fact, the gel time was so fast that the liquid mixture didn't flow completely to the end of mold and this resulted in a portion of the mold being unfilled. Also, the flowability was not good. The resultant non-foaming polyurethane resin did not have good tactile impression because of the Asker A hardness of surface of 77 was too hard.

Example 5

The evaluation of a skin-integrated molded article comprising the laminate of a non-foaming polyurethane resin and a core material The core material which was made of polypropylene and having a thickness of about 3.0 mm was placed in the core part of article mold using double-stick tape. The mold size was 300 mm×900 mm×4.0 (t) mm, and the surface temperature of the mold was adjusted to 55° C. Then, the mold release agent (Wax system RIM mold release agent B308-10, commercially available from Cyukyo Yushi Co., Ltd.) was coated on the surface of cavity portion of the article mold and the core part and the cavity part of article mold was closed.

Then, reaction injection molding was carried out by the discharge of a liquid mixture comprising components (I) and (II) as shown in Table 1 for Example 3. The temperature of the mold was adjusted to 30° C., the discharge rate was 200 g/second, and the mixing pressure was 15 MPa, as described above in Example 1.

After the integral molding with a non-foaming polyurethane resin and a core material made of polypropylene was completed and the resultant integral molding was removed from the mold, the evaluation of the skin-integrated molded article comprising the laminate of the non-foaming resin and a molded core material was carried out.

The thickness of non-foaming polyurethane resin as the skin of the resultant laminate was 1.0 mm and the cure time of the skin-integrated molded article was 60 seconds from the time of pouring the non-foaming polyurethane resin. There was no delamination observed between the non-foaming polyurethane resin and core material made of polypropylene.

The resultant skin-integrated molded article had an excellent quality appearance of the skin, a density of 1.05 g/cm$^3$, and good tactile impression which was soft in terms of feel, with the Asker A hardness of surface of 53.

Example 6

The evaluation of a skin-integrated molded article comprising the laminate of a non-foaming polyurethane resin, a semi-rigid polyurethane foam and a core material:

The evaluation of a skin-integrated molded article comprising the laminate of a previously painted non-foaming polyurethane resin which was prepared using the formulation as described in Example 2, a semi-rigid polyurethane foam for a crush pad and a core material (of polypropylene) was carried out.

First, the non-foaming polyurethane resin used for a design surface skin was molded. Then, the mold release agent (Wax system RIM mold release agent B308-10, commercially available from Cyukyo Yushi Co., Ltd.) was coated on the core part and cavity part of article mold for the skin. The mold size was 300 mm×900 mm×1.0 (t) mm, and the surface temperature was adjusted to 55° C. A paint film was made on the whole surface of the cavity part. Then, the core part of article mold for the skin and the cavity part of article mold was closed. After that, the reaction injection molding was carried out by the discharge of the liquid mixture comprising components (I) and (II), which consisted of a polyol mixture (I) and a polyisocyanate compound (II) as described in Example 2, with the mold temperature being adjusted to 30° C. The resultant non-foaming polyurethane resin molded article having a thickness of 1.0 (t) mm was removed from the mold. Following this, the resultant non-foaming polyurethane resin molded article was placed on the cavity portion of an article mold for foaming, in which the mold size was 300 mm×900 mm×11.0 (t) mm, and wherein the temperature of the whole mold was adjusted to 40° C. The core material made of polypropylene which was about 3.0 mm thick, was fixed on the core part of foaming mold using double-stick tape, and the mold was closed.

Onto the molded article of the non-foaming polyurethane resin which was placed on the cavity portion of the foaming mold, was poured a mixture of raw materials for forming a semi-rigid polyurethane foam to yield a molded article density of 0.185 g/cm³, such that the semi-rigid polyurethane foam was formed by reaction injection molding the mixture of raw materials between the core material and the non-foaming polyurethane resin. The temperature of the mold was adjusted to a temperature of 25° C. The RIM process used the "A System high pressure reaction machine" manufactured by the Canon Inc., at a discharge rate of 300 g/second, a mixing pressure of 15 MPa and a pouring time of 2.0 seconds, to yield the integral molding with skin. Upon removing the integral molding with skin from the mold, a skin-integrated molded article comprising the laminate of a non-foaming polyurethane resin, a semi-rigid polyurethane foam and a core material was obtained.

The resultant skin-integrated molded article had good tactile impression and was very soft in terms of feel, with the Asker A hardness of surface of 40. Additionally, no blister formation was observed on the non-foaming polyurethane resin which formed the skin. The resultant skin-integrated molded article had an excellent quality appearance, with excellent bonding properties including no delamination between the skin and the semi-rigid polyurethane foam.

TABLE 1

Description of Components for Polyol mixture (I) and Polyisocyanate compound (II)

Polyol mixture (I)
Polyether polyol (1)

Starter: propylene glycol
Average functionality: about 2.0,
Hydroxyl value of polyether polyol: 45 mg KOH/g
Chain extender (2)

Chain extender (2-1) diethyldiaminotoluene
Chain extender (2-2) ethylene glycol
Catalyst (3)

Catalyst (3-1) 33% solution of triethylenediamine in propylene glycol
Catalyst (3-2) dibutyltin dilaurate
Polyisocyanate compound (II)
Polyisocyanate compound (II-1):

Carbodiimide-uretoimine modified diphenylmethane diisocyanate
NCO %: 29.0%, viscosity: 40 mPa · s/25° C.
Polyisocyanate compound (II-2):

Urethane modified isocyanate prepolymer based on diphenylmethane diisocyanate (NCO %: 17.0%, viscosity: 1000 mPa · s/25° C.) and polyol (average functionality: 3, average molecular weight: 6,000)
Polyisocyanate compound (II-3):

Polymethylene polyphenyl polyisocyanate
NCO %: 31.5%, viscosity: 180 mPa · s/25° C.

TABLE 2

Formulation for non-foaming polyurethane resin moldings

|  | Examples | | | | Comparative Examples | | |
|---|---|---|---|---|---|---|---|
|  | 1 | 2 | 3 | 4 | 1 | 2 | 3 |
| Polyol mixture (I) | | | | | | | |
| Polyether polyol (1) (pbw) | 93.95 | 93.55 | 96.75 | 93.95 | 96.85 | 95.35 | 88.95 |
| Chain extender (2-1) (pbw) | 5 | 5 | 2 | 5 | | | 10 |
| Chain extender (2-2) (pbw) | | | | | 1.5 | 3 | |
| Catalyst (3-1) (pbw) | 0.6 | 1.0 | 0.8 | 0.6 | 1.2 | 1.2 | 0.6 |
| Catalyst (3-2) (pbw) | 0.05 | 0.05 | 0.05 | 0.05 | 0.05 | 0.05 | 0.05 |
| Weathering agent | 0.4 | 0.4 | 0.4 | 0.4 | 0.4 | 0.4 | 0.4 |
| Total | 100 | 100 | 100 | 100 | 100 | 100 | 100 |
| Hydroxyl value (mg KOH/g) | 77.1 | 79.2 | 60.6 | 77.1 | 77.4 | 103.8 | 106.4 |
| Polyisocyanate compound (II) | | | | | | | |
| Polyisocyanate compound (II-1) | x | | | | | | |
| Polyisocyanate compound (II-2) | | x | | | | | |
| Polyisocyanate compound (II-3) | | | x | x | x | x | x |
| NCO Index | 105 | 105 | 105 | 105 | 105 | 105 | 105 |
| Mixing Ratio (pbw) | | | | | | | |
| Polyol mixture (I)/ Polyisocyanate compound (II) | 100/ 20.9 | 100/ 36.6 | 100/ 15.1 | 100/ 19.3 | 100/ 19.3 | 100/ 25.9 | 100/ 26.6 |

TABLE 3

Evaluation of non-foaming polyurethane resin molding

|  | Example | | | | Comparative Example | | |
|---|---|---|---|---|---|---|---|
|  | 1 | 2 | 3 | 4 | 1 | 2 | 3 |
| Temperature of raw material (° C.) | 30 | 30 | 30 | 30 | 30 | 30 | 30 |
| Pouring quantity (g/sec.) | 200 | 200 | 200 | 200 | 200 | 200 | 200 |
| Reaction property gel time (sec.) | 8 | 14 | 11 | 9 | 6 | 5 | 3 |
| Thickness (mm) | 1.0 | 1.0 | 1.0 | 1.0 | 1.0 | 1.0 | 1.0 |
| Cure time (sec.) | 60 | 70 | 60 | 60 | 150 | 120 | 60 |
| Mixing performance | Good | Good | Good | Good | Bad | Good | Good |
| Flowability | Good | Good | Good | Good | Good | Good | Bad |
| Physical property | | | | | | | |
| Density (g/cm$^3$) | 1.05 | 1.02 | 1.05 | 1.05 | 1.05 | 1.05 | n.d. |
| Asker A hardness of surface | 60 | 49 | 53 | 60 | 60 | 75 | 77 |
| Tensile strength (MPa) | 4.6 | 3.4 | 4.0 | 3.7 | n.d. | 4.1 | n.d. |
| Elongation at break (%) | 440 | 415 | 420 | 165 | n.d. | 80 | n.d. |
| Tearing strength (N/cm) | 240 | 195 | 200 | 142 | n.d. | 135 | n.d. | n.d. not determined

TABLE 4

Evaluation on the skin-integrated molded article comprising a laminate of non-foaming polyurethane resin and core material

|  | Example 5 |
|---|---|
| Temperature of raw material (° C.) | 30 |
| Pouring quantity (g/sec.) | 200 |
| Thickness (mm) | 1 |
| Cure time (sec.) | 60 |
| Mixing performance | Good |
| Flowability | Good |
| Bonding property | Good |
| Physical property | |
| Density (g/cm$^3$) | 1.05 |
| Asker A hardness of surface | 53 |

Effect Of The Invention

In accordance with the present invention, a monolithic skin-integrated laminate suitable for use as an interior article, particularly a vehicle interior article, can be formed which has a very soft feeling, an excellent quality appearance and also forms a skin having excellent moldability. Since, in accordance with the present invention, the reaction time of polyurethane is shortened, the cycle time is shortened and yield is improved, due to necessity of minimum size of the design surface. Accordingly, the production cost can be decreased and urethane mist does not result, thus, having no adverse effect on the work environment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing a vehicle-interior, integral molded article comprising a skin-integrated laminate comprising: (i) a design surface skin of a non-foaming polyurethane resin and (ii) a core material, comprising the steps of:
    (1) installing a core material to a core part of an article mold,
    (2) applying a mold release agent on a cavity part surface of an article mold,
    (3) optionally, applying a paint film on the cavity part surface of an article mold,
    (4) closing the core part and the cavity part of an article mold,
    (5) reaction injection molding (I) a polyol mixture and (II) a polyisocyanate compound, thereby forming a reaction mixture of (I) said polyol mixture and (II) said polyisocyanate compound, wherein the reaction mixture has a gel time of 5.0 to 15.0 seconds, and wherein (I) said polyol mixture comprises: (1) a polyol, (2) from 2.0 to 7.0 parts by weight, based on 100 parts by weight of (I) the polyol mixture, of a chain extender, the chain extender being selected from the group consisting of 1-methyl-3,5-diethyl-2,4-diaminobenzene, 1-methyl-3,5-diethyl-2,6-diaminobenzene and mixtures thereof, (3) a catalyst, and (4) optionally, an auxiliary agent, to create a non-foaming polyurethane resin having a surface hardness of 30 to 70 as measured by an Asker A hardness meter at a cure time of 30 to 100 seconds; and
    (6) removing the integral molded article.

* * * * *